United States Patent Office 3,088,878
Patented May 7, 1963

3,088,878
METHOD OF DYEING KERATINACEOUS MATERIALS WITH NITRO-SUBSTITUTED PARA-PHENYLENE DIAMINE COMPOSITIONS
Walter H. Brunner, Easton, Pa., and Alexander Halasz, Stamford, Conn.
No Drawing. Filed Nov. 22, 1960, Ser. No. 70,907
8 Claims. (Cl. 167—88)

This invention relates to novel compounds, dyeing compositions containing the novel compounds, and methods for dyeing keratinaceous material by the use of the novel compounds.

It has now been found that novel nitro-substituted paraphenylene diamines wherein one of the amino radicals is a secondary hydroxyalkylamino radical having from 1 to 4 carbon atoms, wherein the second amino radical is the primary amino radical and wherein the nitro radical is ortho to the secondary amino radical possess many advantageous properties as dyes for keratinaceous material.

The novel compounds of this invention can be represented by the following generic formula:

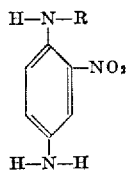

wherein R is a hydroxyalkyl radical having from 1 to 4 carbon atoms. Illustrative of the novel compounds of this invention there can be mentioned: 1-(2'-hydroxyethyl)amino-2-nitro-4-aminobenzene; 1-(3'-hydroxypropyl)amino-2-nitro-4-aminobenzene; 1-(2'-3'-dihydroxypropyl)amino-2-nitro-4-aminobenzene; 1-(4'-hydroxybutyl)amino-2-nitro-4-aminobenzene; and the like. The preferred compound is 1-(2'-hydroxyethyl)amino-2-nitro-4-aminobenzene. The hydroxyalkyl radical as represented by the generic formula can be a monohydroxy radical or a polyhydroxy radical, e.g., dihydroxy, although the monohydroxy radical is preferred.

The p-phenylene diamines of this invention when used for dyeing keratinaceous material are advantageously employed without the use of the conventional peroxide additives, e.g., hydrogen peroxide, for color formation or fixation to keratinaceous materials. Nitro derivatives of certain aminobenzene compounds such as 1-(2'-hydroxyethyl)amino-2-amino-4-nitrobenzene and 1-(2'-hydroxyethyl)amino-4-amino-3-nitrobenzene are mentioned in the published literature as suitable for the dyeing of animal fibers, without the use of the conventional oxidizing agents. The p-phenylene diamines of this invention possess highly advantageous properties over many other known nitro derivatives of phenylene diamines including the above two compounds described in the published literature. Some of the advantageous properties possessed by the compounds of this invention as compared to prior art compounds include any one or more of the following features, namely: a pronounced affinity for the hair and an actual penetration of the hair shaft; a good dyeing union with both normal and permanently waved hair, particularly gray hair; dyetake which is deep and uniform; good rubfastness, and washfastness, e.g., upon shampooing; production of bright and lustrous shades particularly in the bluish-red series; freedom from staining the scalp; or good stability and dyetake over a wide pH range, including the pH range of about 7.5 to about 9.5.

The novel compounds of this invention can be produced by the catalytic hydrogenation of a 1-hydroxyalkylamino - 2,4 - dinitrobenzene, e.g., 1-(2'-hydroxyethyl) amino-2,4-dinitrobenzene to the corresponding 1-hydroxyalkylamino-2-nitro-4-aminobenzene, e.g., 1-(2'-hydroxyethyl)amino-2-nitro-4-aminobenzene. The catalytic hydrogenation can be accomplished by introducing about 3 mols of hydrogen into a hydrogenation apparatus maintained at about 25° C. to about 65° C. and about 2 to 3 atmospheres of pressure and which contains a mixture of (a) a solution of about 1 mol of a 1-hydroxyalkylamino-2,4-dinitrobenzene in an alkyl alcohol such as methanol, ethanol or isopropanol; (b) a catalytically effective quantity of platinum or palladium; and (c) about 2 mols of an aqueous solution of a strong inorganic acid such as hydrochloric or sulfuric acid, e.g., a 50% solution of $H_2SO_4$ in water, to give a strongly acid reaction mixture. The hydrogenation produces the acid addition salt of the product 1-hydroxyalkylamino-2-nitro-4-aminobenzene. The acid addition salt is then reacted with an alkaline material by the conventional methods well known in the art to produce the free base form of the 1-hydroxyalkylamino-2-nitro-4-aminobenzene.

The dyeing compositions of this invention comprise an aqueous alkaline solution of the novel phenylene diamines. In addition to the water, alkalizing agent and phenylene diamine derivative, the compositions can also contain the conventional ingredients found in dyeing compositions such as organic solvents for the dye, thickeners, detergents, gums, and the like. The compositions can be applied to keratinaceous materials by the conventional techniques used in the art. Illustratively, when applied to living hair on the human head the compositions can be applied to the hair with a brush, sponge, or other means of cotnact, such as dipping until the hair is properly saturated with the composition. The reaction time or time of contact of the dyeing composition with the keratinaceous material is not critical and can vary over the wide range used in the dyeing art such as periods of about 5 minutes to about 2 hours and preferably from about 15 minutes to about 60 minutes. The dyeing temperature can vary over wide limits as is conventional in the art. Thus, the dyeing temperatures can vary from about room temperature, e.g., about 20° C. to about 60° C. and preferably from about 20° C. to about 45° C.

The dyeing compositions of the invention can be prepared by the conventional methods used in the dyeing art. Thus, they can be prepared by dissolving or dispersing the dye in water of the desired concentration. Water miscible organic solvents can be employed to facilitate solution of the dye; in this event, the dye can be dissolved first in the solvent and then diluted with water. Illustrative of the organic solvents which can be used, there can be mentioned: alkyl monohydric alcohols such as those having from 1 to 6 carbon atoms, e.g., ethanol, isopropanol, etc.; aliphatic dihydric alcohols such as those having from 2 to 6 carbon atoms, e.g., propylene glycol; and various other polyhydric alcohols; ketones; or esters. The dispersion of the various ingredients can also be facilitated by addition of a detergent or dispersing agent such as lauryl or myristyl sulfate or sulfonate. When water miscible organic solvents are employed the solvent can vary from about 1% to about 30% of the aqueous composition and preferably from about 2% to 10% by weight of the aqueous composition. The detergent or dispersing agent can vary within the same ranges of concentration as described for the solvent.

Any water-soluble alkalizing agent that will not interfere (i.e., is compatible) with the dye employed, and will not precipitate the dye or introduce any possibility of toxicity under the conditions of use, or injure the scalp or hide of the pelt, at its ultimate concentration in the composition to be applied to the keratinaceous material, can be used. A preliminary test of some selected alkalizing agent can be made to note its compatibility with the dye or to introduce possibility of toxicity or injury.

Ammonium hydroxide, because of its freedom from toxicity over a wide concentration range and its economy is an acceptable alkalizing agent. However, there can be used in place of, or together with the ammonia, any other compatible ammonia derivative alkalizing agent such as a lower alkanolamine such as mono-, di-, or triethanolamine, or a heterocyclic amine as morpholine, or a lower aliphatic mono- or diamine such as monomethylamine, dimethylamine, monoethylamine, or diethylamine or amines such as tetraethylenepentamine, propylenediamine, dipropylenetriamine, etc. Any of these ammonia derivative alkalizing agents as well as ammonium hydroxide may be broadly referred to as an "ammonium alkalizant."

Also, as alkalizing agent, any alkaline earth hydroxide, for example, calcium hydroxide or magnesium hydroxide, can be used up to the limit of its solubility in the composition and at any concentration that fails to produce a precipitate with any of the components of the composition. The dissolved alkaline earth hydroxide is preferred over the alkali metal hydroxides, such as sodium hydroxide, or potassium hydroxide, or carbonates, such as sodium carbonate and bicarbonate, any of which can also be used so long as their ultimate concentration in the final dyeing solution is below that which might possibly irritate the scalp, or injure the hide of the fur pelt.

The quantity of the various ingredients in the dyeing compositions of this invention can vary over a wide range. The phenylene diamine colorants can be employed in the conventional concentrations used in dyeing of the various keratinaceous materials. Illustratively, tinctorially effective quantities of the phenylene diamine derivative can vary from less than about .01% to greater than about 10% by weight of the aqueous solution. In the dyeing of living human hair the concentration of the dye will preferably vary from about 0.05% to about 5% by weight of the aqueous solution and particularly from about 0.1% to about 3%. Any selected compatible alkalizing agent should be used to give a pH greater than 7, such as about 7.5 to about 12 and preferably from about 8 or 8.5 to 11. The quantity of the alkalizing agent employed can vary over a wide range depending on the dye and particular alkalizing agent employed. Thus, the alkalizing agent can vary from about 0.1% to about 5% and preferably from about 0.5% to about 2% by weight of the aqueous solution. The water content of the composition is ordinarily the major constituent, i.e., at least 50% by weight and can vary over a wide range such as about 60% to about 97%, by weight, of the composition and preferably about 75% to 95% of the composition. The exact quantity of water employed will be dependent in large measure on the quantity of other additives such as solvents.

The phenylene diamines employed in this invention are water dispersible in the usual generic sense as embracing true solutions of the dyes in water or any aqueous medium within the bounds of the invention as well as stable homogeneous colloidal solutions of them in such aqueous medium. Thus, the aqueous medium includes the aqueous alkaline medium. It includes also any aqueous medium containing, for example, a sufficient amount of a compound, e.g., ethanol, employed as a common solvent to enhance the solution of the dye or some other organic material. The compositions can be formulated as solutions, gels, emulsions, dispersions, and the like.

The following examples are illustrative of the invention: The term "parts" as used in the examples and specification refers to parts by weight, unless otherwise specified.

EXAMPLE 1

*Reduction of 1-(2'-Hydroxyethyl)Amino-2,4-Dinitrobenzene to 1-(2'-Hydroxyethyl)Amino-2-Nitro-4-Aminobenzene*

A glass lined hydrogenation autoclave was charged with 5 grams of 5% platinum on charcoal catalyst, 20 ml. of water, 300 ml. of isopropanol, 113.5 grams (0.5 mol) of N-(2'-hydroxyethyl)2,4-dinitroaniline, also referred to in this specification as 1-(2'-hydroxyethyl)amino-2,4-dinitrobenzene, and 200 grams of sulfuric acid (50% by weight of $H_2SO_4$). The temperature of the reaction mixture was brought up to about 60° C. and then there was introduced gaseous hydrogen under a pressure of about 50 p.s.i. After absorption of 1.5 mols of hydrogen, the autoclave was cooled to 25° C. to 20° C. The reaction mixture was then filtered. The yellow crystals of the sulfuric acid salt of 1-(2'-hydroxyethyl)amino-2-nitro-4-aminobenzene were recovered as a precipitate and were recrystallized from 1,000 ml. of hot water. After cooling the crystals were converted to the free base with aqueous ammonia. The 1-(2-hydroxyethyl)amino-2-nitro-4-aminobenzene was recovered as the residue by filtering the ammonatical mixture. This residue was in the form of violet crystals having a melting point of 127° C.

EXAMPLE 2

Five parts of 1-(2'-hydroxyethyl)amino - 2 - nitro-4-aminobenzene was admixed with 5 parts of isopropanol, 970 parts of water, 10 parts of monoethanolamine and 10 parts of methyl cellulose. This mixture was dissolved by stirring at about 50° C., then permitted to cool to the ambient temperature of about 33° C. and finally poured over gray hair on the human head. The composition was permitted to remain on the hair for about 25 minutes, after which time the hair was washed and thoroughly rinsed with water. The hair was dyed a bluish-red color.

This application is a continuation-in-part of our co-pending application Ser. No. 55,136, filed on September 12, 1960.

What is claimed is:

1. A composition for dyeing keratinaceous material comprising an aqueous solution of a tinctorially effective quantity of a para-phenylene diamine derivative having the following generic formula:

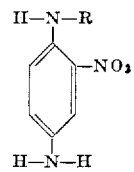

wherein R is a hydroxyalkyl radical having from 1 to 4 carbon atoms; and a sufficient quantity of an alkalizing agent to give the aqueous solution a pH of about 7.5 to about 12.

2. A composition for dyeing keratinaceous material comprising an aqueous solution containing from about 0.5% to about 5% by weight of a para-phenylene diamine having the following generic formula:

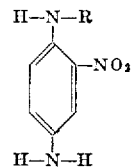

wherein R is a hydroxyalkyl radical having from 1 to 4 carbon atoms; and a sufficient quantity of an alkalizing agent to give the aqueous solution a pH of about 8 to about 11.

3. The composition of claim 2 wherein R of the generic formula is the 2'-hydroxyethyl radical.

4. A process for dyeing keratinaceous material which comprises applying thereto a tinctorially effective quantity of an aqueous solution containing a para-phenylene diamine derivative having the following generic formula:

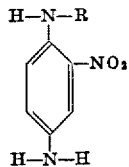

wherein R is a hydroxyalkyl radical having from 1 to 4 carbon atoms; and a sufficient quantity of an alkalizing agent to impart a pH of from about 8 to about 11 to the said aqueous solution.

5. A process for dyeing living hair on the human head which comprises applying thereto an aqueous solution containing from about 0.05% to about 5% by weight of a para-phenylene diamine derivative having the following generic formula:

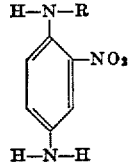

wherein R is a hydroxyalkyl radical having from 1 to 4 carbon atoms; a sufficient quantity of an ammonium alkalizant to impart a pH of about 8 to about 11 to said aqueous solution; and wherein the said aqueous solution is at a temperature of about 20° C. to about 45° C.

6. The process of claim 5 wherein the para-phenylene diamine derivative is 1-(2'-hydroxyethyl)amino-2-nitro-4-aminobenzene.

7. The process of claim 5 wherein the para-phenylene diamine derivative is 1-(3'-hydroxypropyl)amino-2-nitro-4-aminobenzene.

8. The process of claim 5 wherein the para-phenylene diamine derivative is 1-(2'-3'-dihydroxypropyl)amino-2-nitro-4-aminobenzene.

References Cited in the file of this patent

UNITED STATES PATENTS

| | | |
|---|---|---|
| 1,980,536 | Lange | Nov. 13, 1934 |
| 2,401,658 | Paul | June 4, 1946 |
| 2,750,326 | Eckhardt | June 12, 1956 |
| 2,750,327 | Eckhardt | June 12, 1956 |

FOREIGN PATENTS

| | | |
|---|---|---|
| 707,618 | Great Britain | Apr. 21, 1954 |

UNITED STATES PATENT OFFICE
CERTIFICATE OF CORRECTION

Patent No. 3,088,878            May 7, 1963

Walter H. Brunner et al.

It is hereby certified that error appears in the above numbered patent requiring correction and that the said Letters Patent should read as corrected below.

Column 2, line 33, for "cotnact" read -- contact --; column 4, line 61, for "0.5%" read -- 0.05% --.

Signed and sealed this 12th day of November 1963.

(SEAL)
Attest:

ERNEST W. SWIDER            EDWIN L. REYNOLDS

Attesting Officer            Acting Commissioner of Patents